(12) United States Patent
Uehara (10) Patent No.: US 7,946,002 B2
(45) Date of Patent: May 24, 2011

(54) CONNECTING DEVICE

(75) Inventor: Ryoichiro Uehara, Toyama-ken (JP)

(73) Assignee: YKK Corporation, Tokyo (JP)

( * ) Notice: Subject to any disclaimer, the term of this patent is extended or adjusted under 35 U.S.C. 154(b) by 700 days.

(21) Appl. No.: 11/977,607

(22) Filed: Oct. 25, 2007

(65) Prior Publication Data

US 2008/0098579 A1    May 1, 2008

(30) Foreign Application Priority Data

Oct. 30, 2006 (JP) ................. 2006-293888

(51) Int. Cl.
*A44B 11/25* (2006.01)
(52) U.S. Cl. ....... 24/265 R; 24/601.2; 24/625; 24/265 H
(58) Field of Classification Search ................ 24/265 H, 24/265 R, 265 BC, 265 EC, 265 AL, 625, 24/905, 601.2; 59/95; 403/164
See application file for complete search history.

(56) References Cited

U.S. PATENT DOCUMENTS

| | | | | |
|---|---|---|---|---|
| 1,150,892 | A | * | 8/1915 | Sherwood .......................... 59/95 |
| 1,551,455 | A | | 3/1925 | Barnowitz |
| 4,093,293 | A | * | 6/1978 | Huggett ...................... 294/82.33 |
| 4,600,331 | A | * | 7/1986 | Gray ............... 403/165 |
| 4,669,907 | A | * | 6/1987 | Patton .............. 403/78 |
| 6,286,190 | B1 | | 9/2001 | Friend et al. |
| 6,735,828 | B2 | * | 5/2004 | Kaneko ............ 24/615 |

FOREIGN PATENT DOCUMENTS

| | | |
|---|---|---|
| EP | 0 099 577 B1 | 12/1986 |
| EP | 0 567 011 B1 | 10/1993 |
| EP | 0 664 406 B1 | 7/1995 |
| GB | 2 254 368 A | 10/1992 |
| JP | Y-62-27701 | 7/1987 |
| JP | 6227701 A | 8/1994 |

OTHER PUBLICATIONS

European Search Report for EP Appl. No. 07019960.9, dated Jan. 30, 2008.

* cited by examiner

*Primary Examiner* — James R Brittain
(74) *Attorney, Agent, or Firm* — Alston & Bird LLP (57) ABSTRACT

A connecting device which has an excellent appearance, produces no frictional sound between a connecting device main body such as a swivel hook main body and a belt attaching member and can be assembled easily and securely. The connecting device includes a neck portion standing from a proximal portion of a main body of the connecting device and an engagement head which is expanded in an outward direction form a center of an axis line such that a diameter thereof can be reduced, the engagement head being provided at a front end of the neck portion. A belt attaching member is connected to the main body rotatably around the neck portion. A through hole which the engagement head can be engaged with by insertion is formed in part of the belt attaching member. In the through hole, a small-diameter hole portion having a smaller diameter than the diameter of the engagement head and a large-diameter hole portion having a large diameter than the diameter of the engagement head are connected via a stepped portion. The large-diameter hole portion has a ring-like member which allows the neck portion to be inserted therethrough. The ring-like member has a cylindrical wall portion which is accommodated in the large-diameter hole portion and a ring-like engaging portion provided at an end of the wall portion and extended toward a center thereof. An inside diameter of the engaging portion is equal to an outside diameter of the diameter of the engagement head when it is reduced.

3 Claims, 5 Drawing Sheets

CONNECTING DEVICE

BACKGROUND OF THE INVENTION

1. Field of the Invention

The invention relates to a connecting device, such as a swivel hook made of a synthetic resin, which can be easily connected to a stopper attached to a bag such as a shoulder bag or a knapsack by hooking or a buckle made of a synthetic resin for use in connecting or disconnecting both ends of a single belt or two belts, and more particularly, to a connecting device in which a belt attaching member and a connecting device main body are rotatable with respect to each other.

2. Description of Related Art

Conventionally, a swivel hook which is one of connecting devices, in which a hook-like swivel hook main body and a belt attaching member are connected rotatably to each other, have been put to practical use as disclosed in, for example, Japanese Utility Model Application Publication (JP-Y) No. 62-27701 and U.S. Pat. No. 6,286,190.

The swivel hook of JP-Y-62-27701 has a swivel hook main body and a belt attaching member. The swivel hook main body comprises a neck portion and an engagement head which is provided at a front end of the neck portion and expanded in an outward direction from a center of an axis line such that a diameter of the engagement head can be reduced. The belt attaching member has a through hole in which the neck portion and the engagement head can be inserted. The through hole has a small-diameter hole portion having a smaller diameter than the diameter of the engagement head and a large-diameter hole portion having a larger diameter than the diameter of the engagement head connected to the small-diameter hole portion via a stepped portion. When the engagement head of the swivel hook main body is inserted from the small-diameter hole portion of the through hole and engaged with the stepped portion, the swivel hook main body and the belt attaching member can be easily assembled.

The swivel hook disclosed in U.S. Pat. No. 6,286,190 has a swivel hook main body and a belt attaching member. The swivel hook main body comprises a neck portion and an engagement head which is provided at a front end of the neck portion and expanded in an outward direction from a center of an axis line. The engagement head is made to pass through a through hole in the belt attaching member and exposed on an outer face of the through hole. Then, a ring-like opening member made of elastic material such as rubber is interposed between the engagement head and the belt attaching member so as to assemble the swivel hook. The opening member absorbs an impact when the swivel hook main body is pulled, and when an excessive shock is received, the swivel hook main body slips out of the belt attaching member.

This kind of the swivel hook is demanded to be assembled securely and easily because the swivel hook main body and the belt attaching member are manufactured separately. Further, it is demanded not to produce a frictional sound between the swivel hook main body and the belt attaching member.

The swivel hook disclosed in JP-Y-62-27701 can be assembled easily only by inserting the engagement head of the swivel hook main body into the through hole in the belt attaching member, the through hole comprising the small-diameter hole portion and the large-diameter hole portion. The engagement head has a structure which can be expanded or reduced in a diameter direction. The engagement head is inserted from the small-diameter hole portion with the diameter of the engagement head reduced and then its diameter is expanded at the large-diameter hole portion so that the engagement head is engaged with the stepped portion and accommodated in the large-diameter hole portion. Therefore, the engagement head is accommodated inside the through hole and thus, is not exposed outside, thereby presenting a good appearance. However, it is necessary to select a material suitable for the swivel hook main body and the belt attaching member in consideration of the strength and friction. In many cases, a frictional sound offensive to the ear is generated upon a rotation, depending on the material adopted.

The swivel hook disclosed in U.S. Pat. No. 6,286,190 comprises three composition members, that is, a swivel hook main body, a belt attaching member and a ring-like opening member which is interposed between the swivel hook main body and the belt attaching member. The swivel hook main body and the belt attaching member are made of metal, and the ring-like opening member is made of a synthetic resin having elasticity such as rubber. However, it is troublesome to assemble the three components because no large-diameter hole portion is formed unlike JP-Y-62-27701, and the engagement head is exposed outside, thereby not presenting a good appearance. Although the ring-like opening member is disposed mainly to absorb a shock, it is difficult to eliminate the frictional sound offensive to the ear generated between the metal and the elastic material such as rubber when the metallic swivel hook main body is rotated with respect to the belt attaching member unless any special processing is executed.

SUMMARY OF THE INVENTION

An object of the invention is to provide a connecting device which is easy to assemble and whose engagement head is not exposed outside, the connecting device preventing occurrence of frictional sound when a connecting device main body is rotated with respect to a belt attaching member and presenting a beautiful appearance.

The above-mentioned object is achieved effectively by the basic configuration of the invention, that is, a connecting device including: a connecting device main body having a neck portion and an engagement head which is expanded in an outward direction from a center of an axis line such that a diameter of the engagement head can be reduced, the engagement head being provided at a front end of the neck portion; and a belt attaching member connected to the connecting device main body rotatably around the neck portion, the belt attaching member containing a through hole having a small-diameter hole portion with a smaller diameter than the diameter of the engagement head and a large-diameter hole portion which is connected to the small-diameter hole portion via a stepped portion and has a larger diameter than the diameter of the engagement head, characterized by further including a ring-like member which is accommodated in the large-diameter hole portion of the through hole to allow the neck portion to be inserted therethrough, the ring-like member including a cylindrical wall portion having an outside diameter equal to an inside diameter of the large-diameter hole portion and an engaging portion which is provided at a bottom end of the cylindrical wall portion and expanded toward a center thereof and which the engagement head is engaged with.

In the ring-like member of the connecting device of the invention, it is desired that an inside diameter of the engaging portion is set substantially equal to an inside diameter of the small-diameter hole portion in the belt attaching member. Further, it is preferable that a plurality of ribs extending from a center of the ring-like member toward an inner peripheral surface of the wall portion are formed in the ring-like member.

In addition, it is preferable that a height of the ring-like member of the connecting device of the invention is substantially equal to a height of the large-diameter hole portion, and a height of the engagement head is smaller than a height of the wall portion.

In the connecting device of the invention, the three components, that is, the connecting device main body, the belt attaching member and the ring-like member are independent of one another, and the ring-like member is accommodated in the large-diameter hole portion of the through hole formed in the belt attaching member via a stepped portion. The ring-like member is open to allow the engagement head of the connecting device main body to be inserted therein, and comprises a cylindrical wall portion stood along the inner peripheral surface of the large-diameter hole portion of the through hole and an engaging portion which is provided at one end of the cylindrical wall portion and expanded toward a center thereof and which the engagement head is engaged with.

When the engagement head of the connecting device main body is inserted into the small-diameter hole portion of the through hole with the diameter of the engagement head reduced and is inserted up to the cylindrical wall portion through the opening in the ring-like member accommodated in the large-diameter hole portion, the engagement head is expanded elastically and engaged with the engaging portion provided and extended on a side of the inside diameter of the ring-like member. As for the assembly procedure at this time, the engagement head may be inserted into the opening in the ring-like member via the stepped portion after the ring-like member is fitted to the large-diameter hole portion. Alternatively, after the engagement head is inserted through the large-diameter hole portion, the ring-like member may be forced into the large-diameter hole portion from an opposite side.

In any case, after the connecting device is assembled, the engagement head is accommodated in an accommodating space within the cylindrical wall portion of the ring-like member. Consequently, the engagement head is never exposed on the outside face from the cylindrical wall portion, that is, also never exposed outside from the through hole in the belt attaching member, thereby presenting an excellent appearance. By interposing the ring-like member between the connecting device main body and the large-diameter hole portion of the belt attaching member, each material can be selected appropriately depending on the function, thereby meeting diversified demands. Further, since the outside diameter of the cylindrical wall portion of the ring-like member is substantially equal to the inside diameter of the large-diameter hole portion in the belt attachment portion, for example, when the ring-like member is accommodated in the large-diameter hole portion with the engaging portion of the ring-like member set down, the ring-like member can be inserted in a stable condition because the inner wall surface of the large-diameter hole portion serves as a guide face. After accommodated in the large-diameter hole portion, the engaging portion of the ring-like member is placed on the stepped portion between the large-diameter hole portion and the small-diameter hole portion, so that the engagement head of the connecting device main body can maintain its posture in a stable state, thereby executing a secure assembly.

In the invention, if the inside diameter of the engaging portion of the ring-like member is set equal to the inside diameter of the small-diameter hole portion in the belt attaching member, the engagement head of the connecting device main body can be easily inserted into the opening in the ring-like member. In a case where the ring-like member has a plurality of ribs extending from the center of the ring-like member toward the inner peripheral surface of the wall portion, reinforcement of the ring-like member toward a central direction and maintenance of the shape of the ring-like member are achieved, and there is such an effect that deformation of the large-diameter hole portion of the through hole, in which the ring-like member is accommodated, is prevented.

The height of the ring-like member is substantially equal to the height of the large-diameter hole portion and the height of the engagement head is not larger than the height of the wall portion. For this reason, only by accommodating the ring-like member in the large-diameter hole portion and placing the surface of the ring-like member on a flat plate, the ring-like member can be accommodated in the large-diameter hole portion securely. When the assembly is executed in this state, the engagement head is never exposed outside because the height of the engagement head is not larger than the height of the wall portion, thereby facilitating the assembly.

DESCRIPTION OF THE PREFERRED EMBODIMENTS

Hereinafter, preferred embodiments of the invention will be described specifically with reference to the accompanying drawings. Note that the invention is not restricted to the embodiments described below but may be modified in various ways within the scope of claims.

First Embodiment

Figure 1:
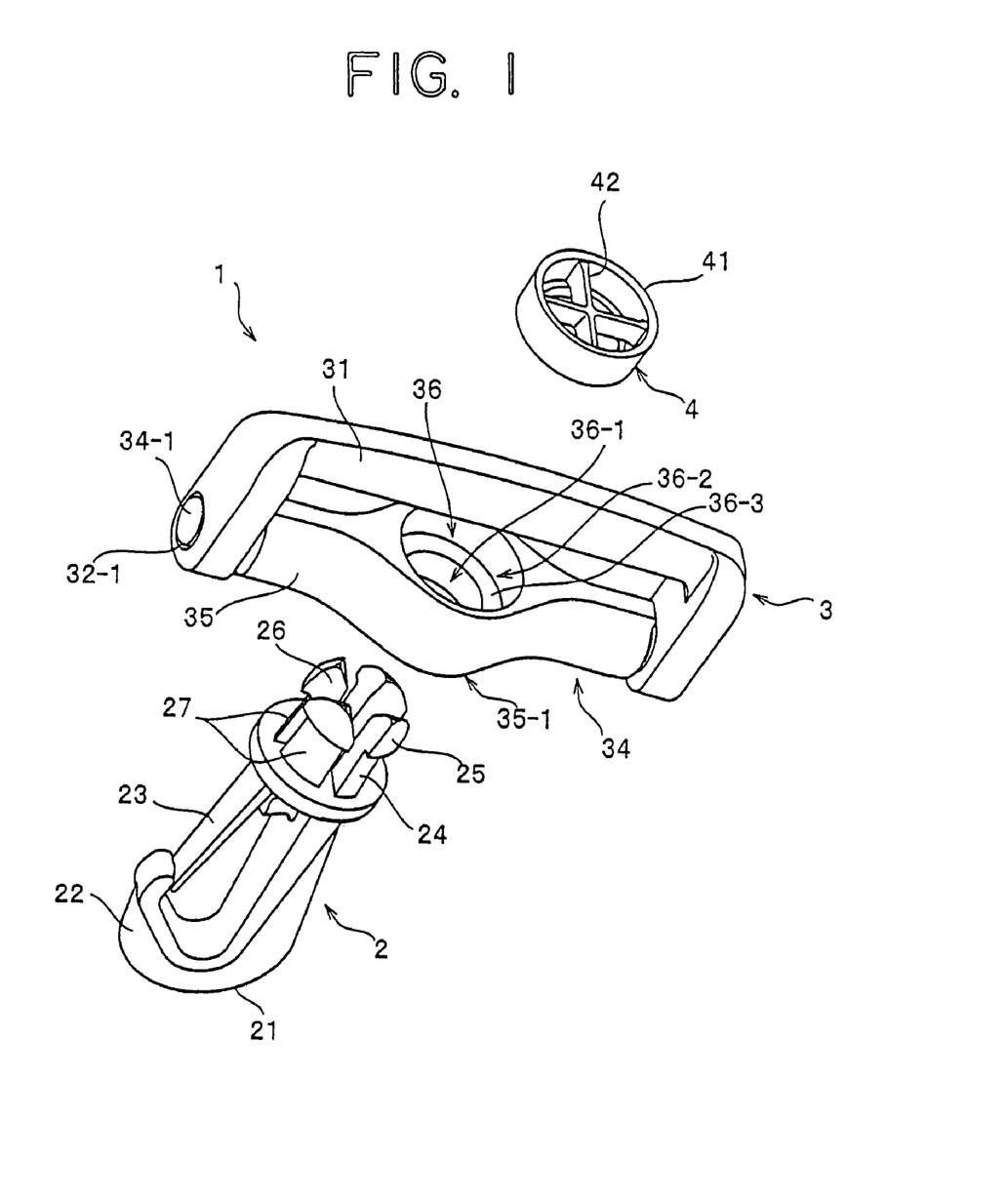
FIG. 1 is an exploded perspective view of a swivel hook according to a first embodiment.
Figure 2:
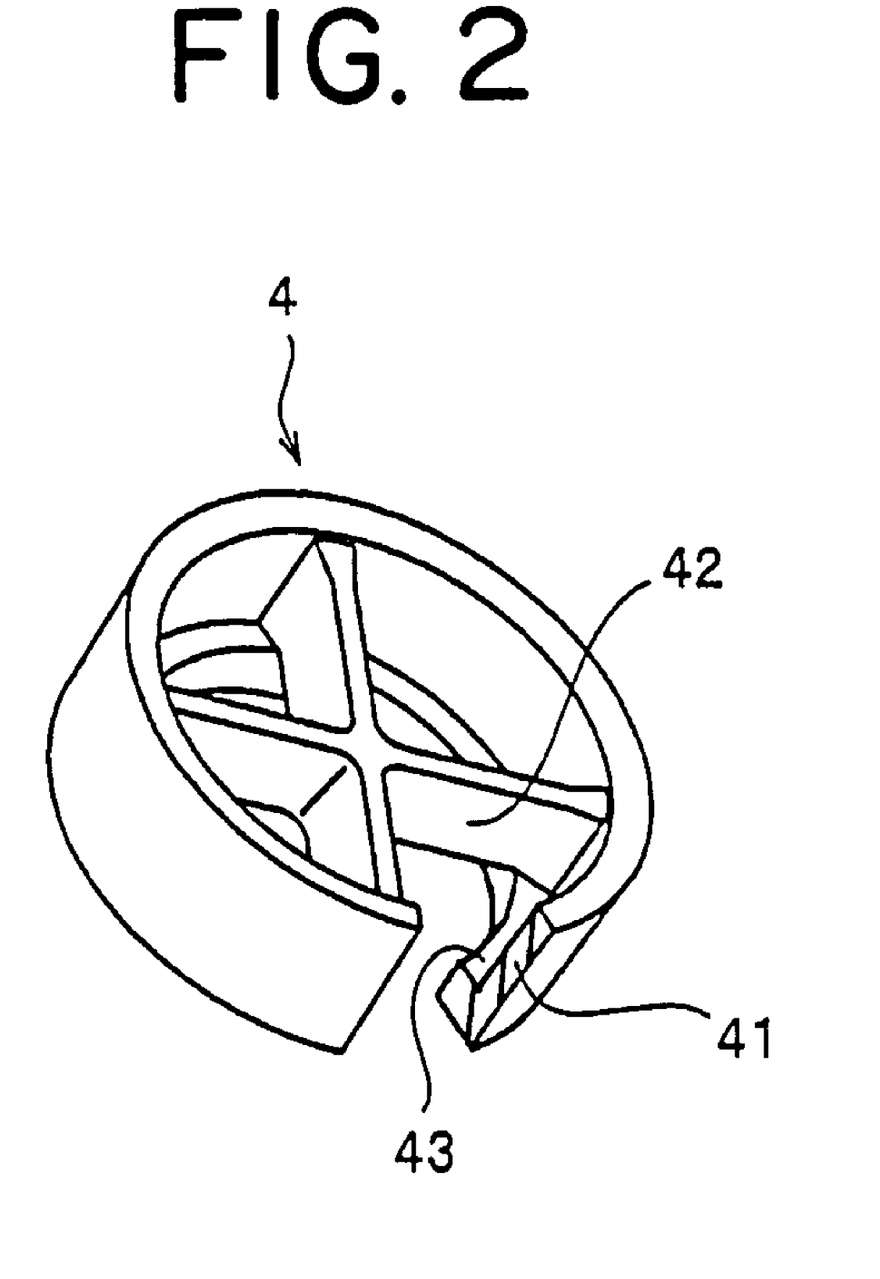
FIG. 2 is an enlarged perspective view of a ring-like member of the swivel hook.
Figure 3:
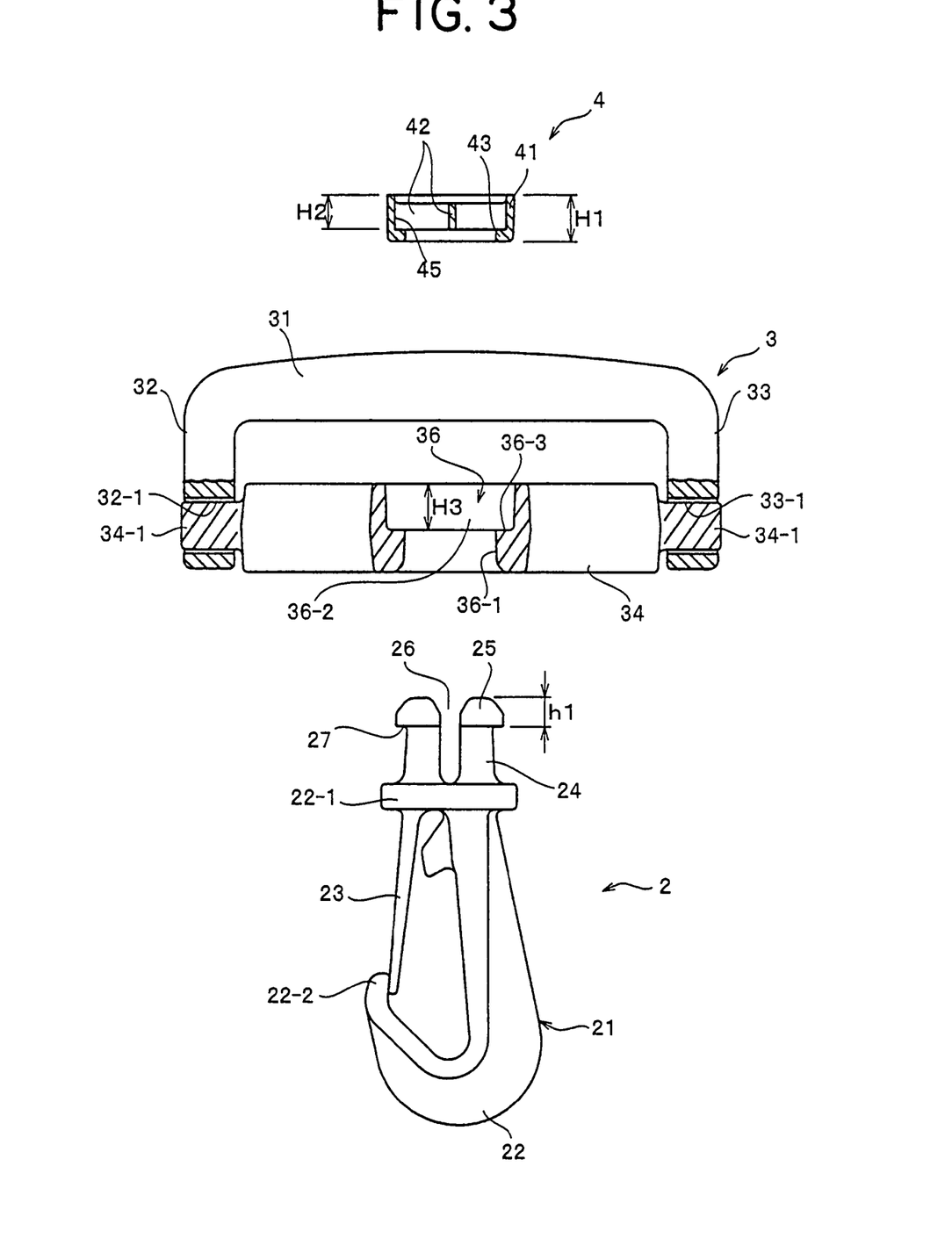
FIG. 3 is an exploded front view of the swivel hook.
Figure 4:
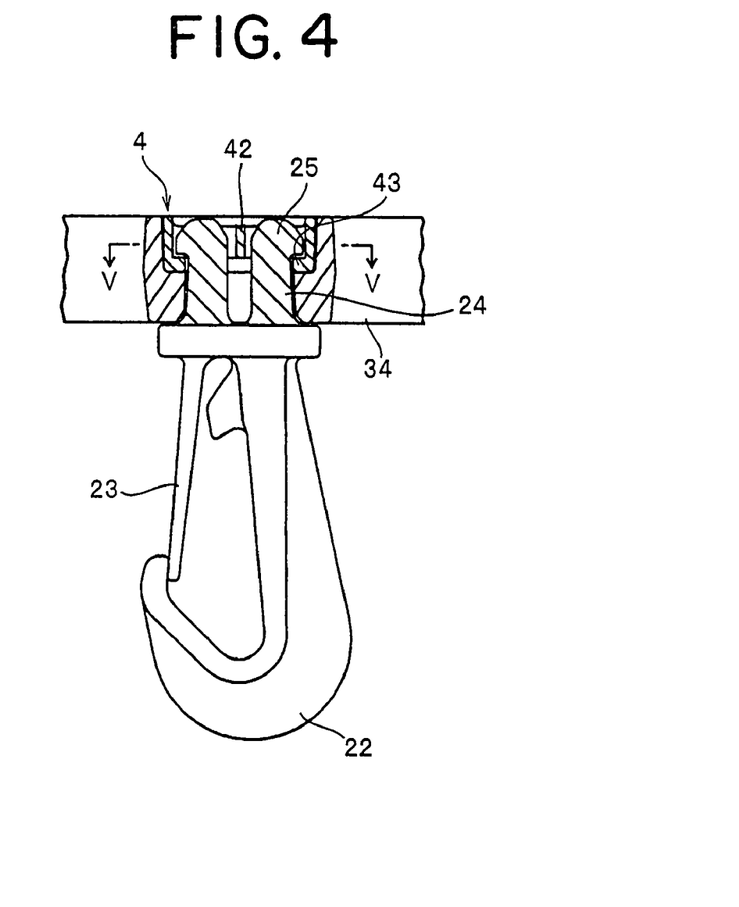
FIG. 4 is a partially broken front view showing an assembled state of the swivel hook.
Figure 5:
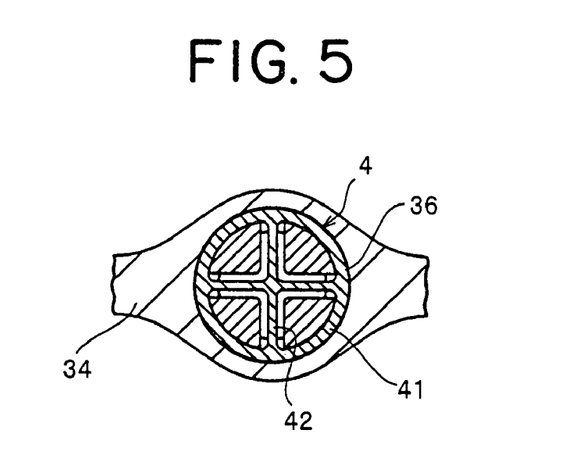
FIG. 5 is a sectional view of the swivel hook taken along the line V-V of FIG. 4.

FIG. 1 is a perspective view of a swivel hook which is a representative example of a connecting device according to a first embodiment of the invention, in which respective components of a swivel hook are disassembled. FIG. 2 is a partially cut enlarged perspective view showing a ring-like member of the swivel hook. FIG. 3 is a partially broken enlarged front view of the components of the swivel hook. FIG. 4 is a partially broken front view of major portions showing the assembled swivel hook. FIG. 5 is a sectional view taken along the line V-V of FIG. 4. In the following description, a direction from an engagement head 25 to a hook portion 22 in a swivel hook main body 2 shown in FIG. 1 is a downward direction and a right-left direction along a longitudinal direction of the belt attaching member 3 is the right-left direction.

A swivel hook 1 of the invention comprises the swivel hook main body 2 as a connecting device main body, a belt attaching member 3 to be attached to an end portion of a belt or the like, and a ring-like member 4. The belt attaching member 3 is connected rotatably to the swivel hook main body 2 via the ring-like member 4.

The swivel hook main body 2 and the belt attaching member 3 may be formed of a synthetic resin, for example, polyacetal (POM) or polyethylene terephthalate (PET), and the ring-like member 4 may be formed of a synthetic resin such as polyamide (PA) and polybutylene terephthalate (PBT) or metal such as zinc and aluminum. For the swivel hook main body 2 and the belt attaching member 3, it is preferable to select a material difficult to deform due to load or the like, and for the ring-like member 4, it is preferable to use a material having excellent lubricating ability with respect to the material of the swivel hook main body 2 and the belt attaching member 3.

Such a combination of the materials enables production of a strong swivel hook which generates little frictional sound even when a relative pulling or rotation is caused between the swivel hook main body 2 and the belt attaching member 3. The frictional sound is considered to be caused because the materials adhere to each other at a contact portion therebetween and when one material slides relative to the other, the adhering portion slips and is worn. Particularly, it is well known that polyacetals adhere to each other easily. Therefore, construction of frictional members in a rotation friction portion with polyacetal should be avoided. However, various combinations as well as the above-described materials may be adopted for the invention.

As shown in FIGS. 1 and 3, the swivel hook main body 2 comprises a neck portion 24, which is projected upward from the center of a flat circular plate-like proximal end portion 22-1 of a hook 21, and a plurality of engagement heads 25 which are expanded outward radially from the center of an axis line of the front end of the neck portion such that its diameter can be reduced. The center of the axis line mentioned here means a line which passes through the center of the cylindrical neck portion 24 and extends in the projection direction of the neck portion 24. This also serves as the center of rotation of the belt attaching member 3. The engagement head 25 and the neck portion 24 are constituted of plural divided pieces 27 by split grooves 26, and each of the divided pieces 27 stands from the center of the proximal end portion 22-1 of the hook 21. In this embodiment, the split grooves 26 present a cross-shape as seen in its plan view, thereby forming four divided pieces 27.

The hook 21 has the hook portion 22 extending in a substantially J-shape downward from the proximal end portion 22-1, and an opening of the hook portion 22 is closed elastically by a slip stopper piece 23. The slip stopper piece 23 is formed integrally from the proximal end portion 22-1 toward a front end 22-2 of the hook portion 22, and a front end of the slip stopper piece 23 is secured to the inner face of the front end 22-2 of the hook portion 22. The engagement head 25 has a height h1 in the upward direction of the neck portion 24.

The belt attaching member 3 presents a rectangular frame shape and comprises a main body portion 31 extending in a horizontal direction, a pair of leg portions 32, 33, and an elongated support lever 34. The pair of leg portions 32, 33 extending in parallel downward in a vertical direction from both ends of the main body portion 31 have shaft holes 32-1, 33-1 formed opposing each other at free end portions. The elongated support lever 34 being in parallel to the main body portion 31 has shaft portions 34-1 at right and left end portions thereof, and the shaft portions 34-1 are fitted rotatably to the shaft holes 32-1, 33-1 of the leg portions 32, 33. Of course, the main body portion 31, the leg portions 32, 33 and the support lever 34 may be molded integrally as one rectangular belt attaching member. Alternately, although the belt attaching member 3 is formed in a rectangular shape in the figure, it may be formed in a square, circular or semi-circular shape.

The support lever 34 has the shaft portions 34-1, 34-1 extending outward from both end portions of a lever main body 35 and a circularly expanded portion 35-1 which is expanded in the back-forth direction in the center in the longitudinal direction of the lever main body 35. A through hole 36 is formed in the circularly expanded portion 35-1 such that the through hole 36 goes through vertically. The through hole 36 has a small-diameter hole portion 36-1 and a large-diameter hole portion 36-2. The small-diameter portion 36-1 has a smaller diameter than the outside diameter of the engagement head 25 when the engagement head 25 is expanded and allows the neck portion 24 to pass rotatably therethrough. The large-diameter hole portion 36-2 accommodates the ring-like member 4 described later and has a larger inside diameter than the outside diameter of the engagement head 25 when the engagement head 25 is expanded, the inside diameter being substantially equal to the outside diameter of the ring-like member 4. There term "substantially equal" here naturally means equal to the outside diameter of the ring-like member 4 and further includes a case where it is slightly larger than the outside diameter because the diameter of the large-diameter hole portion 36-2 should be large enough such that it can accommodate the ring-like member 4 without any looseness.

The small-diameter hole portion 36-1 and the large-diameter hole portion 36-2 are connected each other via a stepped portion 36-3. As shown in FIG. 3, a height H3 of the large-diameter hole portion 36-2 is substantially equal to a height H1 of the ring-like member 4 described later. Consequently, the ring-like member 4 fitted to the large-diameter hole portion 36-2 is never exposed noticeably outside. The "height H1 is substantially equal to the height H3" means that the ring-like member 4 needs to have a dimension which does not allow the ring-like member 4 to project outward so as to be seen outside. The height H3 refers to a height from the step surface of the stepped portion 36-3 to the lower surface of the support lever 34.

The ring-like member 4 has a smooth cylindrical outer peripheral surface and comprises a cylindrical wall portion 41 and a ring-like engaging portion 43 at the bottom end of the cylindrical wall portion 41. The cylindrical wall portion 41 has an outside diameter equal to the inside diameter of the large-diameter hole portion 36-2. The ring-like engaging portion 43 extends toward the center, and the engaging head portion 25 is engaged with the ring-like engaging portion 43. The inside diameter of the cylindrical wall portion 41 is large enough to accommodate the engagement head 25 when the engagement head 25 is expanded. The inside diameter of the ring-like engaging portion 43 is smaller than the outside diameter of the engaging head portion 25 when the engaging head portion 25 is expanded, and large enough for the neck portion 24 to be inserted such that the neck portion can move freely. According to this embodiment, a plurality of ribs 42 extending radially from the center of the ring-like member 4 toward the inner peripheral surface of the cylindrical wall portion 41 are formed, so that an internal space of the ring-like member 4 is divided to plural spaces by the ribs 42.

In the represented example, the respective ribs 42 intersect one another at about 90° in the center, thereby presenting a cross-like shape in its plan view. The spaces divided by the ribs 42 are of the same quantity as the divided pieces 27, allowing the respective divided pieces 27 to be inserted. In addition, the width of each of the ribs 42 is smaller than the width of the split groove 26, so that the rib 42 invades into the split groove 26. The ring-like member 4 has the height H1. The height H1 indicates a height from the lower surface to the upper surface of the ring-like member 4, and the height H2 indicates a height from upper surface of the engaging portion 43 to the upper surface of the ring-like member 4.

As shown in FIG. 4, the ring-like member 4 is accommodated in the large-diameter hole portion 36-2 of the belt attaching member 3. The inside diameter of the engaging portion 43 of the ring-like member 4 is set to a substantially equal length to the inside diameter of the small-diameter hole portion 36-1 of the belt attaching member 3. The height of the engaging portion 43 plus the small-diameter hole portion 36-1 is set equal to the length of the neck portion 24 or slightly smaller than the length of the neck portion 24. The inside diameters of the engaging portion 43 and the small-diameter hole portion 36-1 are substantially equal to the outside diameter which allows the engagement head 25 to pass through when the diameter of the engagement head is reduced due to the elastic deformation or are slightly larger than the outside diameter, so that the engagement head 25 can be inserted smoothly with the diameter reduced. The inside diameter of the cylindrical wall portion 41 needs to be set to be equal to the outside diameter of the engagement head 25 when it is in the normal condition, i.e., it is expanded in diameter with some extent of clearance. As shown in FIG. 3, the height h1 of the engaging head portion 25 is set to not larger than the height H2 of the cylindrical wall portion 41, so that the apex of the engaging head portion 25 cannot be seen in a front view and cannot be touched easily from outside. The height hi of the engaging head portion 25 is equal to a height from the engaging surface of the engaging portion 43 up to the upper surface of the cylindrical wall portion 41. The outside wall height H2 of the cylindrical wall portion 41 is equal to the height of a large-diameter hole portion 45.

Next, a procedure for assembling the swivel hook will be described. First, the ring-like member 4 is accommodated in the large-diameter hole portion 36-2 of the belt attaching member 3. At this time, the outer peripheral surface of the ring-like member 4 faces the inner peripheral surface of the large-diameter hole portion 36-2. Then, the engagement head 25 of the swivel hook main body 2 is made to pass through the inside diameter portions of the small-diameter hole portion 36-1 and the ring-like member 4 while reducing the diameter of the engagement head by elastic deformation. When the engagement surface of the engagement head 25 overreaches the engaging portion 43 of the ring-like member 4, the engagement head 25 is restored elastically so as to expand its diameter and is engaged with the engaging portion 43. As shown in FIG. 4, the ring-like member 4 exists between the outer peripheral surface of the engagement head 25 and the inner wall surface of the large-diameter hole portion 36-2 in this engaged state. Because the ring-like member 4 exists between the engagement head 25 and the inner wall surface of the large-diameter hole portion 36-2 in this way, a material having lubricating property to the materials of the swivel hook main body 2 and the belt attaching member 3 can be selected as the material of the ring-like member 4, thereby preventing occurrence of frictional sound. Further, there is another advantage that the through hole formed in the belt attaching member 3 is reinforced because the cylindrical wall portion 41 is fitted to the large-diameter hole portion 36-2.

The height H3 of the large-diameter hole portion 36-2 is substantially equal to the height H1 of the ring-like member 4, and the height h1 of the engaging head portion 25 is set to not larger than the height H2 from the engaging surface of the engaging portion 43 of the ring-like member 4 to the top end of the cylindrical wall portion 41. Consequently, this swivel hook has an excellent appearance, and the belt attaching member 3 accommodating the swivel hook main body 2 and the ring-like member 4 can be assembled easily without use of any special jig. That is to say, the ring-like member 4 is accommodated in the large-diameter hole portion 36-2 and the lower surface of the engaging portion 43 is placed on the stepped portion 36-3 between the small-diameter hole portion 36-1 and the large-diameter hole portion 36-2. Only with this configuration, the ring-like member 4 can be accommodated in the large-diameter hole portion 36-2 securely, so that even when the engagement head 25 is inserted from the side of the small-diameter hole portion 36-1, the front end of the engagement head 25 never interferes with the inner peripheral surface of the engaging portion 43, thereby securing a simple assembly.

Next, the ribs 42 of the ring-like member 4 will be described specifically. FIG. 5 shows a sectional view taken along the line V-V of FIG. 4. When a tensile load is applied in the direction in which the hook portion 22 of the swivel hook main body 2 departs from the belt attaching member 3, the central portion of the support lever 34 is curved downward, so that the through hole 36 having a circular section is about to be deformed to an elliptic shape with the diameter in the longitudinal direction of the support lever 34 decreased. However, deformation of the cylindrical wall portion 41 is blocked by the ribs 42 extending within the inner periphery of the ring-like member 4 and consequently, the deformation of the through hole 36 is prevented. Further, because the ribs 42 are formed integrally with the cylindrical wall portion 41, a force attempting to deform the through hole 36 can be received by the ribs 42 and the cylindrical wall portion 41 at the same time.

For example, when the ring-like member 4 is rotated at 45° from a state shown in FIG. 5, the cylindrical wall portion 41 receives deformation of the through hole 36 first although the ribs 42 are not in parallel to the longitudinal direction of the support lever 34 which is the direction of the deformation, and the force is received by the ribs 42 formed in a hollow space of the cylindrical wall portion 41, thereby preventing the deformation of the through hole 36. Preventing the deformation of the through hole 36 like this maintains the engagement of the engagement head 25, so that the swivel hook 2 and the belt attaching member 3 become difficult to unfasten from each other, thereby intensifying the engagement strength. The intensified engagement strength means the strength for securing the engagement force between the swivel hook main body 2 and the belt attaching member 3 and means that the engagement is difficult to release.

Second Embodiment

Figure 6:
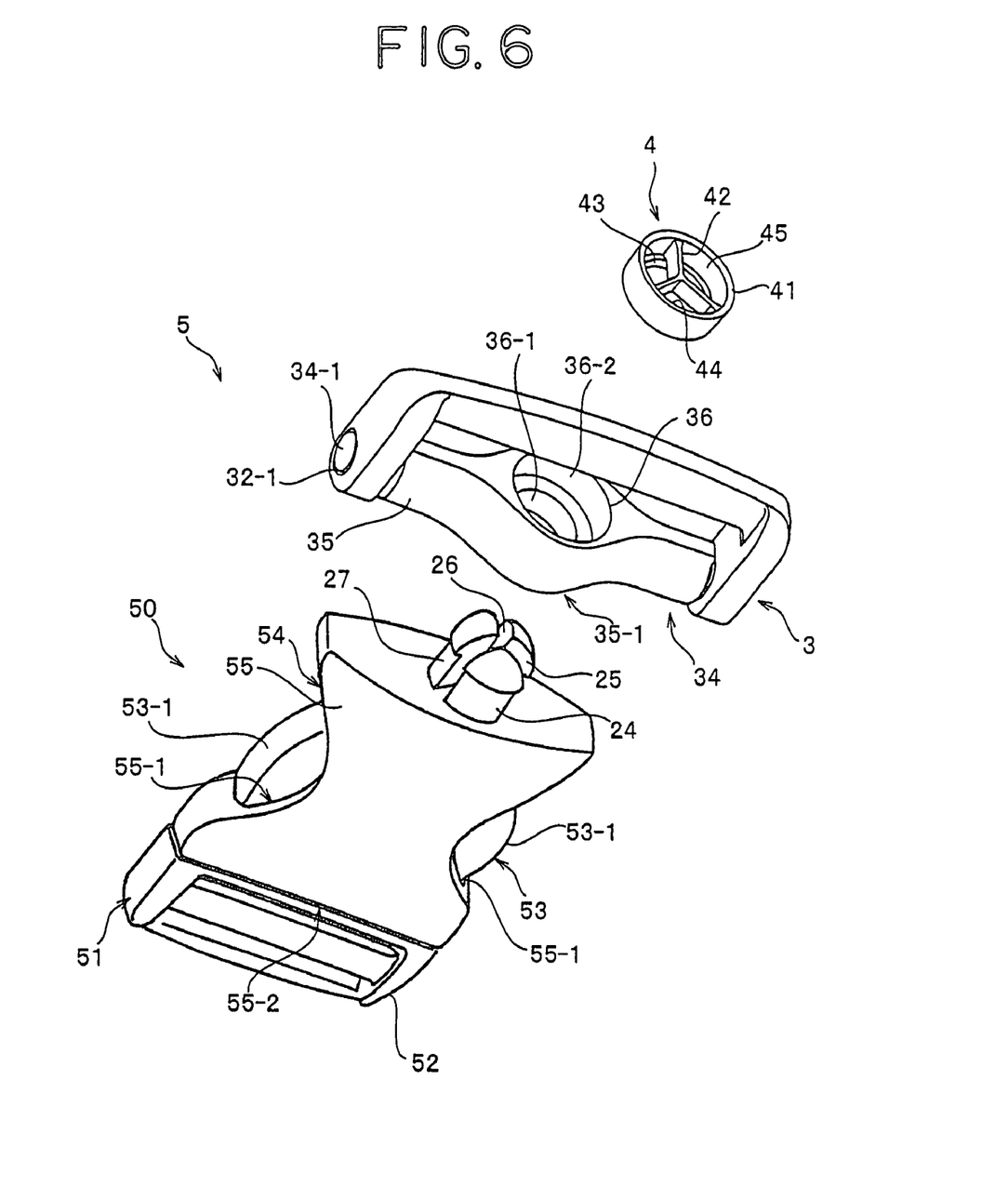
FIG. 6 is a perspective view of a buckle according to a second embodiment.

Next, a buckle 5 as a connecting device according to a second embodiment of the invention will be described. In the description of the second embodiment described below, the same reference numerals and names are used for components having the same configuration as the first embodiment. For the reason, detailed description of those components is omitted. Here, FIG. 6 is a perspective view showing the buckle 5 of the second embodiment.

The buckle 5 according to the second embodiment comprises a buckle main body 50 having a male member 51 and a female member 54 which engages the male member 51 and a belt attaching member 3 which is supported rotatably by the buckle main body 50. The female member 54 has a neck portion 24 and an engagement head 25 which is expanded in an outward direction from the center of the axis line such that the diameter of the engagement head 25 can be reduced at the front end of the neck portion 24. The male member 51 is inserted into a female member main body 55 on an opposite side to the engagement head 25. The engagement head 25 and the neck portion 24 are constituted of three divided pieces 27, which are divided by split grooves 26. The male member 51 has two engagement leg portions 53 projecting substantially in parallel from a proximal portion 52 which is a belt attachment portion, and engaging portions 53-1 of the engagement leg portions 53 are engaged by the female member 54, such that the engaging portions 53-1 are exposed outside from engagement openings 55-1 on both side faces of the female member 54.

The female member main body 55 comprises a flat box whose right and left side faces of its central portion are dented such that they are curved inward as seen in a front view. The engagement opening 55-1 is formed in each of the right and left dented side faces, and a leg portion insertion opening 55-2 which is open in a rectangular shape is formed in an end face on an opposite side to the engagement head 25. These engagement openings 55-1 and the leg portion insertion opening 55-2 communicate with an inside cavity of the female member main body 55. On the other hand, the male member 51 comprises the proximal portion 52 having a belt passage on which a belt end portion (not show) is fixed at one end thereof, and the right and left engagement leg portions 53 extending substantially in parallel in a single direction from the proximal portion 52.

When the right and left engagement leg portions 53 are inserted inside through the leg portion insertion opening 55-2 in the female member main body 55, the engaging portions 53-1 are pressed in a direction of approaching each other by inside wall surfaces of the female member main body 55, so that the right and left leg portions are deformed elastically. When the insertion is continued further, the engaging portions 53-1 of the right and left engagement leg portions 53 arrive at the engagement openings 55-1 on both right and left side faces of the female member 54, and the right and left engagement leg portions 53 are released from the pressing force and restored elastically so as to be engaged with the engagement openings 55-1 on the right and left sides. Because the male member 51 and the female member main body 55 have an ordinary structure, further detailed description thereof is omitted. The shape and structure of the male member 51 and the female member main body 55 are not restricted to the indicated example. Not only conventionally known structures but also the shape and structure of buckles, which is particular to the invention and other than the structure described above and will be developed in future, may be adopted.

The second embodiment is largely different from the first embodiment in that the former is a buckle while the latter is a swivel hook. However, they are substantially not different except that the engagement head 25 and the neck portion 24 are formed of three divided pieces 27 and the ribs 42 of the ring-like member 4 are constituted of three ribs extending radially from the center toward the inner peripheral surface. Therefore, the relation among the height H2 of the wall portion 41, the height H1 of the ring-like member 41, the height H3 of the large-diameter hole portion 36-2 and the height h1 of the engagement head 25 is the same as in the first embodiment.

The second embodiment adopts a structure of bearing against a force of narrowing the through hole 36 in the width direction of the buckle when a belt attached to both sides of the buckle 5 is pulled, by means of the wall portion 41 and the ribs 42 provided within the inner periphery of the wall portion 41. To obtain the same effect at every rotation position, it is preferable that the ribs 42 are disposed at an equal angle of about 120°. According to this embodiment, only the female member 54 has the engagement head 25. However, the male member 51 may be provided with the engagement head 25 instead of the female member 54, or both the male member 51 and the female member 54 may be provided with the engagement head 25.

Preferably, the connecting portions of the ribs 42 provided in the ring-like member 4 with the cylindrical wall portion 41 are provided symmetrically with respect to the center of the cylindrical wall portion 41 such that when the cylindrical wall portion 41 is cut to two sections with a straight line passing through the center thereof, the rib 42 presents a straight line and an end of the rib 42 exists at least on divided two semi-circles. With such a configuration, when the cylindrical wall portion 41 receives a force in a direction of narrowing its diameter, both ends of the linear rib 42 support the cylindrical wall portion 41, thereby bearing against a stronger force.

Although the ring-like member 4 of the first and second embodiments adopts a structure in which the ribs 42 are provided within the inner periphery of the ring-like member, no rib needs to be provided if no strength is demanded in the ring-like member 4 or if its material itself has strength.

The invention is applied to a swivel hook or buckle for use in bags, knapsack and the like.

What is claimed is:
1. A connecting device including:
   a connecting device main body having a neck portion and an engagement head which is expanded in an outward direction from a center of an axis line such that a diameter of the engagement head can be reduced, the engagement head being provided at a front end of the neck portion; and
   a belt attaching member connected to the connecting device main body rotatably around the neck portion, the belt attaching member containing a through hole having a small-diameter hole portion with a smaller diameter than the diameter of the engagement head and a large-diameter hole portion which is connected to the small-diameter hole portion via a stepped portion and has a larger diameter than the diameter of the engagement head,
   and further including a ring-like member which is accommodated in the large-diameter of the through hole to allow the neck portion to be inserted therethrough, the ring-like member having a cylindrical wall portion having an outside diameter equal to an inside diameter of the large-diameter hole portion and an inside diameter which is able to house the engagement head when the engagement head is expanded in diameter, and an engaging portion which is provided at a bottom end of the cylindrical wall portion and extended toward a center thereof and which the engagement head is engaged with, smaller than the outside diameter of the engagement head when expanded in diameter; and
   wherein the ring-like member has a plurality of ribs extending radially from a center of the ring-like member toward an inner peripheral surface of the wall portion.

2. The connecting device according to claim 1, wherein an inside diameter of the engaging portion is set equal to an inside diameter of the small-diameter hole portion, large enough for the neck portion to be inserted such that the neck portion can move freely.

3. The connecting device according to claim 1 or 2, wherein a height of the ring-like member is substantially equal to a height of the large-diameter hole portion and a height of the engagement head is smaller than a height of the wall portion.

* * * * *